US005829465A

United States Patent [19]
Garretson

[11] Patent Number: 5,829,465
[45] Date of Patent: Nov. 3, 1998

[54] CONTAINER HAVING FLUID-WEIGHT CONTROL DEVICE

[76] Inventor: Owen L. Garretson, P. O. Box 108, Farmington, N. Mex.

[21] Appl. No.: 755,292

[22] Filed: Nov. 22, 1996

[51] Int. Cl.[6] .......................... F16K 31/22; F16K 31/383; F16K 31/385
[52] U.S. Cl. ................................. 137/2; 137/38; 137/403; 137/413; 137/414; 137/430; 141/1; 141/198; 222/55; 222/67
[58] Field of Search ............................... 137/1, 2, 38, 43, 137/44, 403, 413, 414, 430, 416, 425; 141/1, 4, 5, 198, 220, 221, 95, 212, 216; 222/55, 57, 64, 67

[56] References Cited

U.S. PATENT DOCUMENTS

| | | | |
|---|---|---|---|
| 3,055,386 | 9/1962 | Moore | 137/403 |
| 3,640,320 | 2/1972 | Elkuch | 137/588 |
| 3,749,141 | 7/1973 | Garretson | 141/5 |
| 3,929,155 | 12/1975 | Garretson | 141/198 |
| 4,064,907 | 12/1977 | Billington et al. | 141/198 |
| 4,305,422 | 12/1981 | Bannink | 141/198 |
| 4,360,038 | 11/1982 | Trinkwalder, Jr. | 141/198 |
| 4,444,230 | 4/1984 | Van Mullem | 137/430 |
| 4,635,480 | 1/1987 | Hrncir et al. | 137/416 |
| 5,048,557 | 9/1991 | Campau | 137/414 |
| 5,090,442 | 2/1992 | Campau | 137/414 |
| 5,246,045 | 9/1993 | Clothier et al. | 141/198 |
| 5,282,496 | 2/1994 | Kerger | 141/198 |
| 5,472,012 | 12/1995 | Wood et al. | 141/198 |
| 5,487,404 | 1/1996 | Kerger | 141/198 |

*Primary Examiner*—George L. Walton
*Attorney, Agent, or Firm*—Lathrop & Gage LC

[57] ABSTRACT

A device, and a container having such a device, is provided for permitting filling the container with a predetermined weight of the fluid. The device and container include a main channel to introduce the fluid into the container at a fill pressure; a detector mechanism to detect a "filled" condition based on fluid weight; and an fluid-weight control mechanism to automatically prevent introducing fluid into the container in excess of the "filled" condition. A compression spring offsets part of the weight of a displacer such that the displacer becomes buoyant as the container becomes "filled". The displacer has a seat mechanism that sealingly engages an orifice mechanism creating a differential pressure, substantially less than the fill pressure, across a control device causing closure of the main channel. The fluid-weight control device, which is substantially independent of the composition and temperature of the fluid and of inertial effects induced in an attempt to thwart the fluid-weight control safeguard, also prevents introduction of fluid into the container as the container is non-upright. Modified embodiments utilize a pilot valve arrangement instead of the differential pressure feature. A method of practicing the invention is also provided.

30 Claims, 5 Drawing Sheets

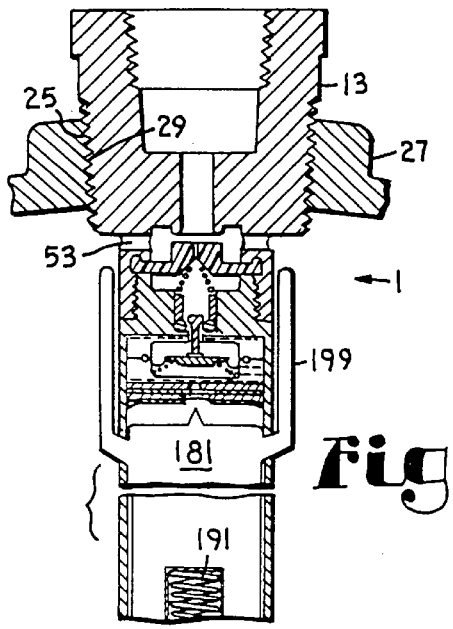
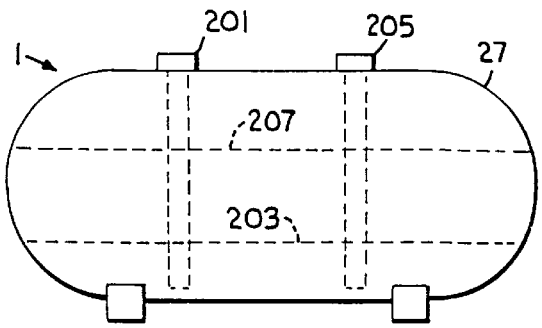
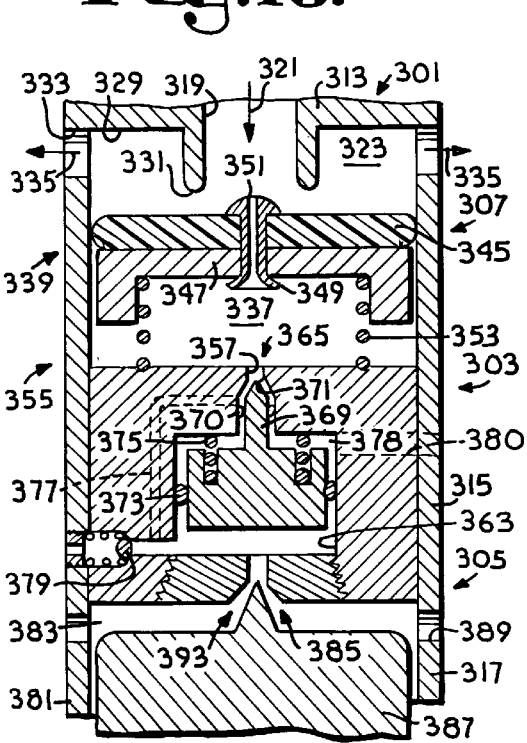
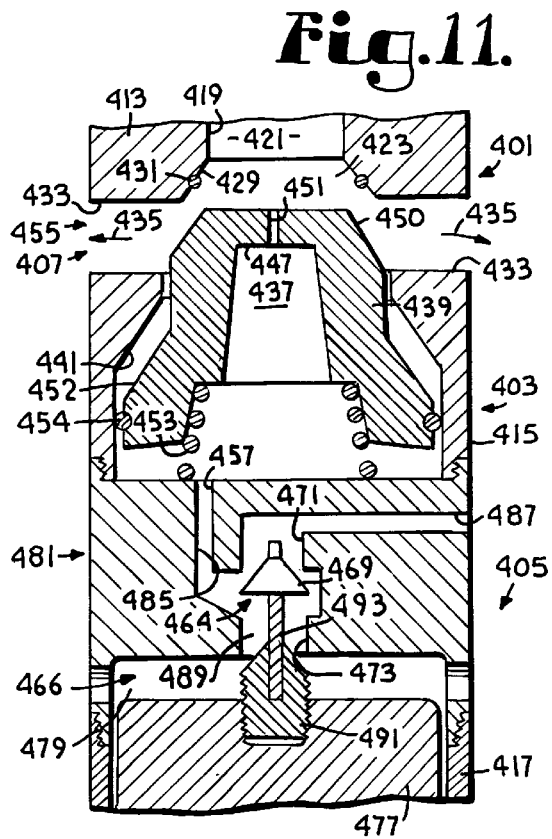

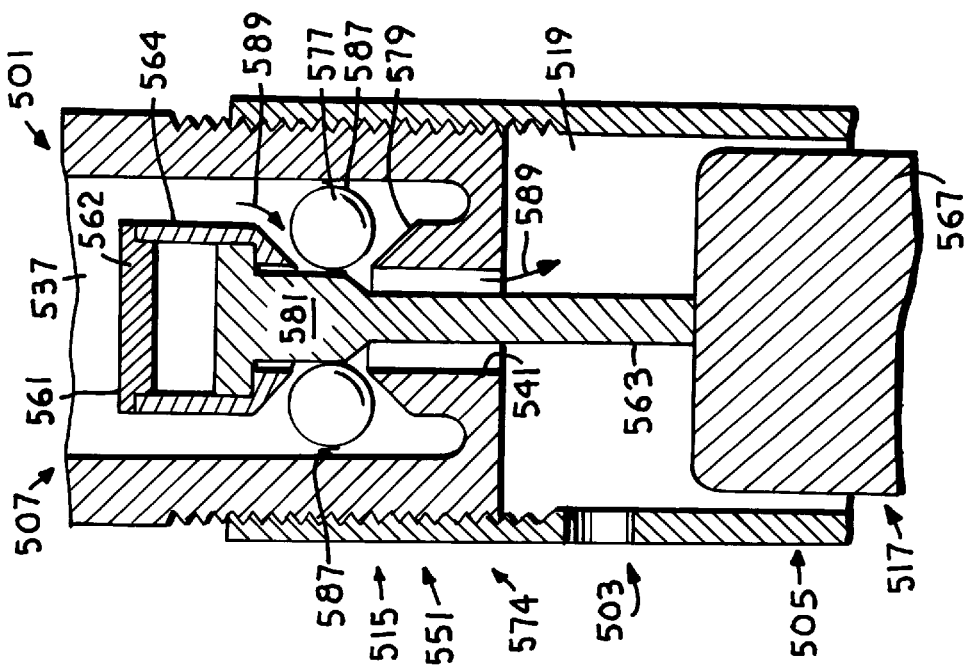
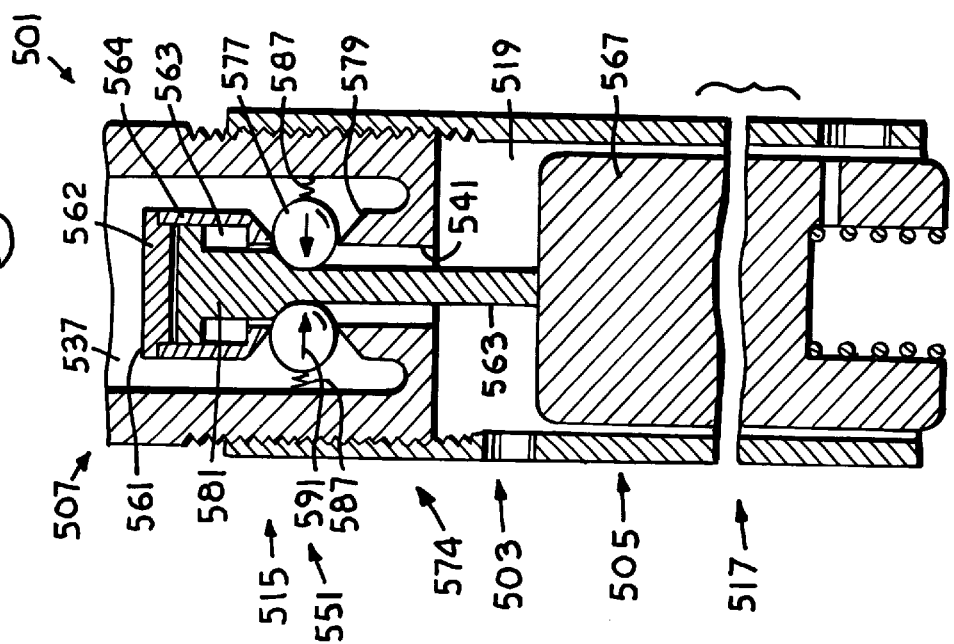

5,829,465

1

CONTAINER HAVING FLUID-WEIGHT CONTROL DEVICE

BACKGROUND OF THE INVENTION

1. Field of the Invention

This invention relates generally to fill valves and containers for containing fluids and, more particularly but without limitation, to fill valves and containers for containing fluids such as propane, butane, and the like.

2. Description of the Related Art

A common occurrence is the filling of containers with fuel or other fluids, such as portable propane tanks for barbeque equipment for example. A common procedure for filling such a tank, wherein the weight of the tank is generally visibly stamped on its outer surface, is to place the tank on scales set at a particular weight, such as twenty pounds plus the empty or tare weight of the tank. As the tank is being filled, someone watches the scales; when the balance indicates that the weight of the tank and its contents is equal to the setting on the scales, filling of the tank is terminated.

Presumably, the tank then holds the desired twenty pounds of fluid. Unfortunately, that may not be the case. For instance, the weight stamped on the tank may not be equal to the weight that would be observed if the tank were totally empty. If the tank has mud or other debris adhering thereto such that the stamped weight is less than the empty weight of the tank at the time of filling, the patron will get less than his money's worth because he will be paying for propane that he is not receiving, namely the weight of propane equal to the weight of the debris. Further, the scales may not be properly calibrated or balanced, or the scales may be set at a reading of less than tare weight plus twenty pounds, particularly if the patron is not positioned whereby the filling attendant's activities can be closely observed. As a result, the patron may again be getting less than his money's worth.

Conversely, a careless or over-busy attendant may permit a patron to fill his own tank. In that situation, the patron may be tempted to get more than his money's worth and introduce more than twenty pounds of propane into the tank, which may present a serious safety problem. The volumes of many fluids, such as butane, propane, etc., are temperature dependent. For example, the volume of a given weight of propane increases approximately one percent for each temperature increase of approximately 5°–6° F. Thus, as the temperature of propane increases, the weight or mass of propane that can be placed in a given volume at a given pressure decreases. By the same token, the pressure of a given weight of a temperature-dependent fluid placed in a closed container at a given temperature may substantially increase as the temperature of the fluid increases.

As a more specific example, the pressure of liquid/vapor phase propane at −44° F. is approximately zero psig and at 100° F. is approximately 172 psig, or a pressure change of 172 psig for a temperature change of 144° F. However, a temperature increase of 1° F. in liquid-phase only propane may cause a pressure increase in excess of 500 psig.

Therefore, what is needed is a device and a container having such a device that determines a certain "filled" condition of the container as fluid is being introduced thereinto by detecting the containment of a predetermined weight of fluid in the container; that automatically prevents further filling of the container beyond such a "filled" condition; that prevents further filling of the container beyond such a "filled" condition even though conduct to thwart such a device is attempted by inducing inertial effects therein; that is substantially independent of the composition, pressure, and/or temperature of the fluid being introduced into and/or contained by the container; that is immune to errors in scales or tare weight of the container; that prevents introduction of fluid into the container unless the container has a essentially upright orientation; and that controls flow into the container with a pressure that has a substantially smaller magnitude than the pressure at which fluid is being introduced into the container.

SUMMARY OF THE INVENTION

An improved device, and an improved container having such a device, is provided for automatically controlling the weight of fluid introduced into and/or contained by the container. The device and container include structure for mounting the device to the container; a main valve or channel for introducing the fluid into the container at any desired fill pressure; a detection mechanism configured to detect containment of a predetermined weight of fluid in the container; a detection mechanism configured to detect a "filled" condition of the container, wherein the "filled" condition of the container is based on the container containing a predetermined weight of the fluid; and a shut off or overfill prevention mechanism, responsive to the detection mechanism, configured to automatically prevent introduction of additional fluid into the container as "filled" condition of the container is detected by the detection mechanism.

The detection mechanism includes a displacer, that extends substantially the entire vertical spacing within the container as the container assumes an upright orientation since the mechanism is responsive to density of fluid in the vapor phase and well as to density of fluid in the liquid phase including of course fluid that is simultaneously present in both the vapor and liquid phases, and a resilient member such as a compression spring configured to operably offset a portion of the weight of the displacer such that the displacer is buoyant as the container assumes an upright orientation and the container contains the desired weight of the fluid needed to constitute the "filled" condition of the container. The displacer has a valving mechanism configured to operably activate the fluid-weight control mechanism as buoyancy of the displacer causes the valving mechanism to fluid-tight sealingly engage an orifice mechanism. The fluid-weight control mechanism includes a differential pressure control system configured to operably provide control of a substantially greater fill pressure with a much smaller differential pressure across the differential pressure control system such as by reducing the differential pressure to which the valving arrangement at the top of the displacer is exposed.

In addition, the fluid-weight control mechanism is configured to prevent introduction of fluid into the container as the container assumes a non-upright orientation even though the container may not have assumed the "filled" condition. Also, the result provided by the fluid-weight control mechanism is substantially independent of the composition, temperature, or pressure of the fluid contained in the container. Further, the fluid-weight control mechanism is also configured to be substantially independent of inertial effects generated in an attempt to introduce additional fluid into the container beyond that required to constitute the "filled" condition of the container.

Modified embodiments utilize a pilot valve arrangement instead of the differential pressure feature.

The improvement includes a method for practicing the invention as described.

PRINCIPAL OBJECTS AND ADVANTAGES OF THE INVENTION

The principal objects and advantages of the present invention include: providing a device for preventing further filling of a container wherein the container contains a predetermined weight of fluid or fluids, and a container having such a device; providing such a device and a container wherein a certain "filled" condition of the container is based on the weight of fluid or fluids contained in the container; providing such a device and a container wherein such "filled" condition of the container is substantially temperature independent; providing such a device and a container wherein such "filled" condition of the container is independent of the density of the fluid or fluids contained in the container; providing such a device and a container wherein filling of the container is substantially immune to inertial effects generated in an attempt to fill the container beyond the "filled" condition of the container; providing such a device and a container wherein introduction of fluid into the container is prevented as the container assumes a non-upright orientation; providing such a device and a container wherein introduction of fluid into the container is controlled by a differential pressure that is substantially smaller than the pressure at which fluid is being introduced into the container; providing such a device and a container wherein introduction of fluid into the container is controlled by a pressure that is substantially smaller than the pressure at which fluid is being introduced into the container; providing such a device and a container wherein introduction of fluid into the container is controlled by a pilot valve arrangement that is activated by a pressure that is substantially smaller than the pressure at which fluid is being introduced into the container; providing such a device and a container wherein a pilot valve has at least one ball-type valve wherein the ball thereof may be operating either at approximately full filling pressure or at a pressure substantially reduced from the full filling pressure, depending on the particular configuration; providing such a device and container wherein introduction of fluid into the container is controlled by a two-stage pilot valving arrangement, one stage providing controlled feeding of fluid into and bleeding of fluid from a first cavity and a second stage controlled by a displacer; and generally providing such a device and a container which is economical to manufacture, effective in operation, reliable in performance, capable of long operating life and particularly well adapted for the proposed usage thereof.

Other objects and advantages of the present invention will become apparent from the following description taken in conjunction with the accompanying drawings, which constitute a part of this specification and wherein are set forth exemplary embodiments of the present invention to illustrate various objects and features thereof.

BRIEF DESCRIPTION OF THE DRAWINGS

FIG. 8 is a fragmentary, partially cross-sectional view of the fluid-weight control device, similar to but reduced relative to FIG. 2, showing a displacer with extenders.

FIG. 9 is a schematic representation of a container having two of the fluid-weight control devices, according to the present invention.

FIG. 10 is an enlarged longitudinal and fragmentary, cross-sectional view of a first modified embodiment of the fluid-weight control device, according to the present invention.

FIG. 11 is an enlarged longitudinal and fragmentary, cross-sectional view of a second modified embodiment of the fluid-weight control device.

FIG. 15 is a fragmentary, cross-sectional view of the third modified embodiment of the fluid-weight control device, similar to that shown in FIG. 13 but showing the device in a closed configuration, according to the present invention.

FIG. 16 is a fragmentary, cross-sectional view of the third modified embodiment of the fluid-weight control device, similar to but enlarged from that shown in FIG. 15 and showing the device in an open configuration.

DETAILED DESCRIPTION OF THE INVENTION

Figure 2:
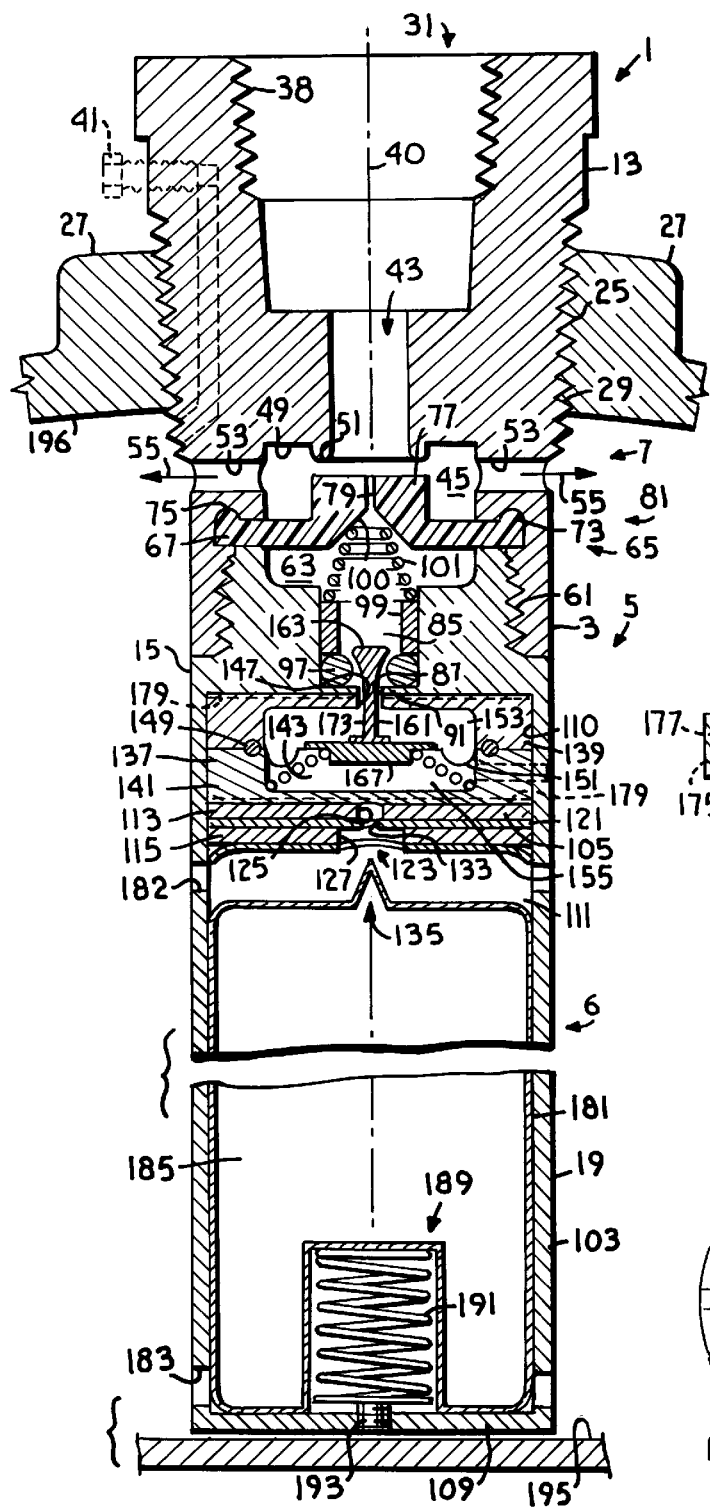
FIG. 2 is an enlarged longitudinal and fragmentary, partially cross-sectional view of the fluid-weight control device, showing the device in an open configuration.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to either a fluid-weight control device or a container having such a fluid-weight control device, in accordance with the present invention, as shown in FIGS. 1 through 9. The device 1 comprises body means 3 and fluid-weight control means 5 including predetermined fluid-weight detection means 6, and shut off means 7.

The body means 3 generally includes an input portion 13, an intermediate portion 15, and a tail portion 19, as hereinafter described. The input portion 13 generally includes container connection means, such as a threaded outer surface 25, for attachment to a tank, cylinder, vessel or other suitable container 27 having a mated tapped throughbore 29. It is to be understood that the present invention is not limited to containers for propane or butane but is applicable to a multitude of different container structures for a multitude of different fluids and mixtures thereof, i.e. liquids and gases, such as iso-butane, propane/butane, salt water, etc., for example.

Figure 1:
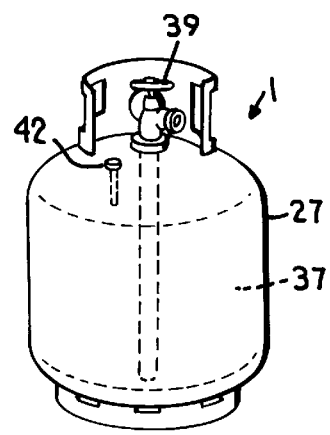
FIG. 1 is a perspective view of a container having a fluid-weight control device, according to the present invention.
Figure 5:
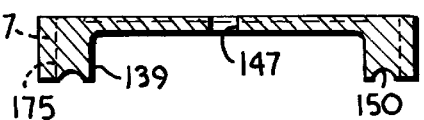
FIG. 5 is an enlarged side elevational view of the top portion of the differential pressure control device of the fluid-weight control device, taken along line 5—5 of FIG. 4.
Figure 4:
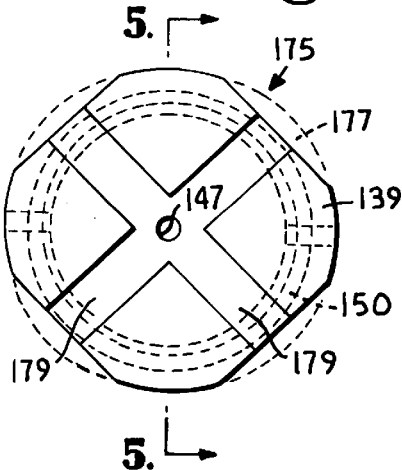
FIG. 4 is an enlarged plan view of a top portion of a differential pressure control device of the fluid-weight control device.

The input portion 13 generally has an axially extending input channel 31 for receiving fluid therethrough for introduction into a container cavity 37 of the container 27. The input portion 13 has connecting means 38, such as an internally or externally threaded surface, for connection to an external fitting such as a hose and adapter for transferring fluid from a source (not shown) to the container 27. For example, the input portion 13 may comprise a manual shut off valve 39 such as that found on some twenty-pound net capacity propane containers commonly used with barbeque equipment wherein the input channel 31 is angled to one side, perpendicularly to an axis 40, as shown in FIG. 1. In addition, the input portion 13 may include a pressure release valve 41, such as that schematically shown in FIG. 2, with a passageway to the upper vapor space of the container cavity 37 of the container 27, and/or a liquid lever detector 42 configured to check the liquid level of the fluid contained in the container 27, as commonly known in the art.

It is to be understood that the pressure relief valve 41 may be an integral part of the device 1 as shown in FIG. 2 or, alternatively, may be a part of the container 27 and separated from the device 1. It is also to be understood that the liquid level detector 42 may be a part of the container 27 and separated from the device 1 as shown in FIG. 1 or, alternatively, may be an integral part of the device 1.

The input portion 13 also includes a throat 43 leading into a distribution cavity 45, which is generally cylindrically shaped and arranged coaxially about the axis 40. An upper wall 49 of the distribution cavity 45 is configured such that a circularly shaped lip 51 extends downwardly therefrom. At least one branch channel 53, and perhaps a plurality thereof depending on the application, is configured to distribute fluid from the input channel 31 to the container cavity 37, as indicated by the arrows designated by the numeral 55 in FIG. 2.

The intermediate portion 15 is spaced adjacently to, and generally aligned coaxially with, the input portion 13. The intermediate portion 15 is fixedly connected to the input portion 13, such as by mated threads 61. The shut off means 7 includes the intermediate portion 15 having a generally cylindrically shaped shut off cavity 63 aligned with the distribution cavity 45.

The shut off means 7 also includes a partition arrangement 65 configured to substantially separate the distribution cavity 45 from the shut off cavity 63. The partition arrangement 65 includes a partition wall or diaphragm 67 spaced generally between the input portion 13 and the intermediate portion 15. The partition wall 67 has a generally circular shape, with an enlarged peripheral edge 73 captured in a circularly shaped groove 75. The partition wall 67 also has a thickened hub 77 extending toward the lip 51, as shown in FIG. 2.

The partition wall 67 has a port 79 axially therethrough. The diametric dimension of the port 79 is substantially smaller than each of the transverse dimension of the throat 43 and the cross-sectional areas available for fluid flow through the branch channels 53. As a result, the volume of fluid flowing through the port 79 is minimal in comparison to the volume of fluid flowing through the branch channels 53.

Figure 3:
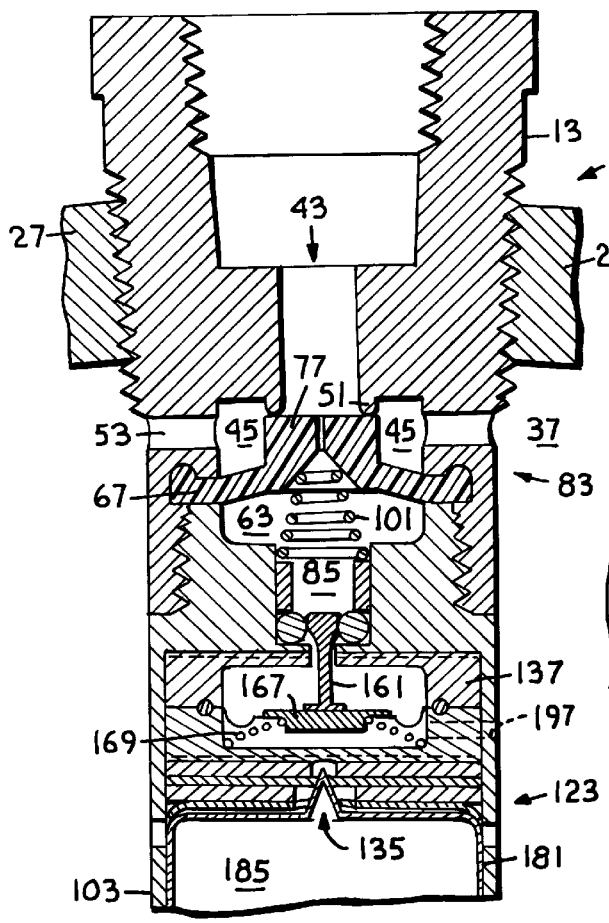
FIG. 3 is an enlarged longitudinal and fragmentary, cross-sectional view of the fluid-weight control device, similar to that shown in FIG. 2 but showing the device in a closed configuration.

The partition wall 67 is generally constructed of resilient, flexible material, such as fabricized rubber or other suitable material, for example, such that the hub 77 thereof can be flexed upwardly to abuttingly engage the lip 51 to thereby prevent fluid from being distributed from the input channel 31 to the distribution cavity 45 and the branch channels 53. The partition wall 67 is configured such that as the pressure of fluid within the shut off cavity 63 is substantially less than the pressure of fluid within the distribution cavity 45, the hub 77 will be spaced apart from the lip 51, sometimes referred to herein as an opened configuration 81. The partition wall 67 is further configured whereby the hub 77 is not spaced apart from the lip 51 as the pressure of fluid within the shut off cavity 63 approaches the pressure of fluid within the distribution cavity 45 but, instead, is flexed upwardly to establish the aforesaid abutting engagement with the lip 51, sometimes referred to herein as a closed configuration 83, as shown in FIG. 3.

The adjacent transverse dimensions of the shut off cavity 63 and the distribution cavity 45 are substantially similar but are substantially greater than the transverse dimension of the throat 43. Therefore, as the hub 77 bears against the lip 51, the upwardly directed fluid force in the shut off cavity 63 maintaining the abutting engagement therebetween is substantially greater than the downwardly directed force of the fluid in the throat 48, unless the fluid is vented through the control bleed port 91, which occurs while the shut off means 7 permits introduction of fluid into the container 27 as described herein.

Figure 6:
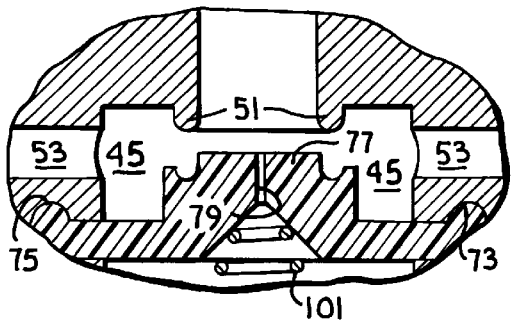
FIG. 6 is a further enlarged and fragmentary, cross-sectional view of a diaphragm of the fluid-weight control device, showing the diaphragm having an alternative configuration different from that shown in FIG. 2.
Figure 7:
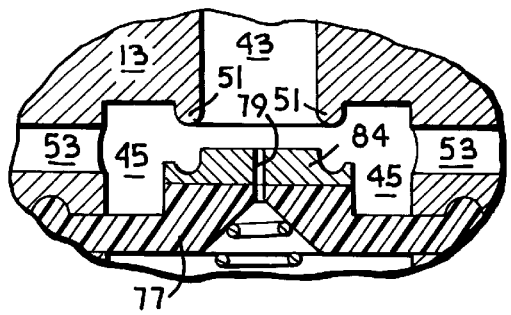
FIG. 7 is a further enlarged and fragmentary, cross-sectional view of another configuration of the diaphragm of the fluid-weight control device.

If desired, the hub 77 may be profiled to more intimately mate with the lip 51, as shown in FIG. 6. Alternatively, the hub 77 may include a plate 84 that is precisely machined to mate with the lip 51, as shown in FIG. 7. It is to be understood that the hub 77 may have numerous different configurations within the nature and scope of the present invention and is not limited to the configurations discussed herein.

The shut off means 7 also includes the intermediate portion 15 having a seat cavity 85 extending axially from the shut off cavity 63 toward, but terminating short of, the tail portion 19 such that a seat wall 87 is formed between the seat cavity 85 and the tail portion 19. A control bleed port 91 extends axially through the seat wall 87.

A seat member 97 having a torus shape or other suitable configuration, such as a precision machined brass ring or an O-ring constructed of rubber or other suitable arrangement, is spaced within the seat cavity 85 in abutting engagement with the seat wall 87. A sleeve 99 or other suitable arrangement, installed by press- or shrink-fit within the seat cavity 85, maintains the seat member 97 securely in place. Preferably, the partition wall 67 has a conically shaped depression 100 opposite the hub 77, as shown in FIG. 2. A compression spring 101 may be used to assist with forcing the hub 77 against the lip 51 as the device 1 assumes the closed configuration 83. The spring constant of the spring 101, however, must be such that the spacing relation between the hub 77 and the lip 51 can operably assume the opened configuration 81 as the fluid pressure in the shut off cavity 63 is substantially less than the fluid pressure in the distribution cavity 45.

The tail portion 19 has a cylindrically shaped outer wall 103 extending from the intermediate portion 15 to a distal member 109. An inner wall 105 divides the space within the outer wall 103 into a control cavity 110 and a tail cavity 111. The inner wall 105 may be constructed of a pair of rigid side walls 113, 115 with an intermediate wall 121 sandwiched therebetween, or other suitable arrangement. An orifice arrangement 123 provides fluid flow communication between the control cavity 110 and the tail cavity 111. The orifice arrangement 123 generally includes an inner orifice 125 through the side wall 113, a larger outer orifice 127 through the side wall 115, and a middle orifice 133 through the intermediate wall 121. The intermediate wall 121 is generally constructed of resilient material and the middle orifice 133 is sized such that a fluid-tight sealing engagement is established by a valving arrangement 135, including the inner wall 105, as the container and device 1 assume a "filled" condition, as hereinafter described. It is to be understood that "filled" may mean the container 27 being filled to the maximum capacity recommended by the manufacturer thereof, sometimes referred to herein as the "full" condition, or, instead, may mean the container 27 containing a predetermined weight of fluid or fluids wherein such predetermined weight represents a quantity of the fluid or fluids that is less than the quantity corresponding to the "full" condition.

Alternatively, the inner wall 105 may consist of a single-layer structure, such as one of the side walls 113, 115 and without the intermediate wall 121. In that event, the orifice arrangement 123 would comprise the corresponding remaining one of the orifices 125 or 127 being precision-machined in order to form the aforesaid fluid-tight sealing engagement provided by the valving arrangement 135 as the container and device 1 assume the "filled" condition.

A regulator or differential pressure control device 137, which substantially occupies the control cavity 110, has an upper portion 139 that is substantially similar to a lower portion 141 thereof, such that a control chamber 143 is formed therebetween. The upper portion 139 has a device bleed port 147 sized similarly to and aligned with, the control bleed port 91. An O-ring 149 in an O-ring groove 150, or other suitable arrangement, provides a fluid-tight seal between the upper portion 139 and the lower portion 141. A diaphragm arrangement 151 between the upper portion 139 and the lower portion 141 divides the control chamber 143 into an upper chamber 153 and a lower chamber 155.

A stem portion 161, having a generally inverted conically shaped upper end 163 and a foot 165, is secured to a disk portion 167 of the diaphragm arrangement 151 and is spaced such that the upper end 163 extends beyond the seat member 97. A helical spring 169 provides support for the disk portion 167, as hereinafter described. The inverted conical shape of the upper end 163 is sized such that the upper end forms a fluid-tight sealing engagement with the seat member 97 as the upper end 163 is displaced downwardly toward, and into abutting engagement with, the seat member 97. The upper end 163 is connected to the disk portion 167 by a shaft 173 that is sized smaller than the control bleed port 91 and the device bleed port 147 such that fluid can flow from the seat cavity 85, through the cavity bleed port 91 and the control bleed port 147, and into the upper chamber 153.

The area of the diaphragm 67 exposed to the shut off cavity 63 is substantially greater than the cross-sectional area of the throat 48 opposing the shut off cavity 63. Thus, as the hub 77 bears against the lip 51, the upwardly directed fluid force in the shut off cavity 63 maintaining the abutting engagement therebetween is substantially greater than the downwardly directed force of the fluid in the throat 48, unless the fluid is vented through the control bleed port 91, which occurs while the shut off means 7 permits introduction of fluid into the container 27 as described herein.

The upper portion 139 and the lower portion 141 are generally cylindrically shaped but have one or more truncated sectors 175 such that passageways 177 are formed between the differential pressure control device 137 and the outer wall 103. One or more grooves 179 in the upper portion 139 along the juncture between the differential pressure control device 137 and the intermediate portion 15 and one or more similar grooves 179 in the lower portion 141, in combination with the passageways 177, provide flow communication between the control bleed port 91 and the orifice arrangement 123.

The predetermined fluid-weight detection means 6 of the fluid-weight control means 5 includes a float or displacer 181. Ports 182 and 183 situated near each end of the displacer 181 provide fluid flow communication between the container cavity 37 and the tail cavity 111. The displacer 181 has an outside diameter that is dimensioned slightly smaller than the inside diameter of the outer wall 103 such that the displacer 181 can be slidably displaced along the axis 40 within the outer wall 103. The outer wall 103 and the displacer 181 are constructed such that any frictional forces therebetween are minimal.

The displacer 181 is generally constructed of light weight material, such as aluminum, or other suitable material. The displacer 181 has a sealed displacer cavity 185 that is dimensioned such that the displacer 181 becomes buoyant as the container 27 contains a weight of fluid that is slightly smaller in magnitude than the weight of fluid predetermined to constitute a "filled" condition for the container 27. Such an arrangement assures that frictional forces generated between the displacer 181 and the outer wall 103 by gravitational components arising from the weight of the displacer 181 are minimal, particularly since the spacing between the displacer 181 and the outer wall 103, although minimal, is sufficient to allow fluid therebetween to serve as a lubricant for longitudinal displacement of the displacer 181 within the outer wall 103.

The displacer 181 has an axially situated spring cavity 189 formed in an outer surface thereof such that a compression spring 191 is mountable therein between the displacer 181 and the distal member 109. The spring 191 is configured whereby the axial force exerted by the spring 191 on the displacer 181 causes the displacer 181 to become buoyant as the weight of fluid in the container 27 satisfies a "filled" condition as the container 27 assumes a normal operating orientation, sometimes referred to herein as an upright orientation. As a result, the displacer 181 abuts against the distal member 109 as the weight of the fluid in the container 27 is less than that required to place the container 27 in a "filled" condition as the container 27 assumes an essentially upright position. If, however, the container 27 should be tilted from such an essentially upright position whereby the thrust provided by the spring 191 exceeds the gravitational weight component of the container 27 along the axis 40, then the spring 191 will responsively displace the displacer 181, causing the valving and orifice arrangements 123, 135 to establish a fluid-tight sealing engagement as described herein, thereby activating the shut off means 7 and preventing fluid from being introduced into the container cavity 37 as the container 27 is inclined from an essentially upright orientation, such as being tilted, lying horizontally, etc.

It is to be understood that the container 27 may have an oblong configuration with the long dimension thereof oriented horizontally, such as the container 27 shown schematically in FIG. 9; regardless, such orientation will be referred to herein as an upright orientation that represents the normal operating orientation of the container 27. It should also be obvious that the configuration of the resilient member 191 and the displacer 181 is dependent upon the particular composition of fluid to be introduced into the container 27.

Preferably, the displacer 181 has an axial length that is slightly less than the axial length of the tail cavity 111 such that the axial distance that the displacer 181 is displaced from resting against the distal member 109 to establishing the fluid-tight sealing engagement is minimal. If desired, an adjusting mechanism 193 may be provided to increase or decrease the thrust of the spring 191 to allow for minor manufacturing deviations in the spring constant of the spring 191.

Preferably, the displacer 181 extends from near a bottom wall 195 of the container 27 to near a top wall 196 of the container 27. In addition, the displacer 181 preferably has a differential buoyancy characteristic that corresponds to variations in the horizontal cross-sectional areas of the container cavity 37. An important feature of the present invention is that the device responds to density of fluid in the vapor phase and well as to density of fluid in the liquid phase, including, of course, vapor existing simultaneously in both the liquid and vapor phases. In other words, the buoyancy contributed by a horizontal slice of the displacer 181 is directly proportional to the corresponding horizontal cross-sectional area of the container cavity 37. The differential buoyancy contributed to the total buoyancy of the displacer 181 at a given level in the container 27 whereat the horizontal cross-sectional area of the container cavity 37 is a certain magnitude is greater or lesser than the differential buoyancy contributed at another level whereat the horizontal cross-sectional area of the container cavity 37 is greater or lesser, the difference in differential buoyancy being in direct proportion to the difference in horizontal cross-sectional area of the container cavity 37 at those two levels. As a result, errors arising from the shape of the container 27 and from the level of fluid in the container 27 at the "filled" condition are substantially reduced or entirely eliminated.

In other words, if the container 27 is cylindrically shaped with a uniform horizontal cross section and horizontal top and bottom walls, the displacer 181 of the present invention may also be cylindrically shaped with a uniform horizontal cross section. However, if the container 27 does not have a uniform horizontal cross section, then the horizontal cross section of the displacer 181 must vary accordingly to obtain desired "filled" accuracy, particularly with regard to fluids present in the container 27 in both the liquid and vapor phases.

To place the displacer 181 in closer proximity to the top wall 196 to thereby further reduce possible error, the displacer 181 may include extenders 199 extending alongside the intermediate portion 15, as schematically shown in FIG. 8. Preferably, the lateral dimensions of the extenders 199 are structured such that the device 1 can be inserted and withdraw through the tapped throughbore 29. Of course, the extenders 199 are preferably structured such that differential buoyancy characteristics thereof are consistent with those of the remainder of the displacer 181.

It is to be understood that the configuration of the device of the present invention for a particular application is dependent upon the volume and shape of the container 27. More specifically, one of the devices designed for a first container 27 having a given volume and shape but installed on a second container 27, having a different volume and/or shape, will not necessarily shut off filling of the second container 27 at the same fluid weight at which it would shut off filling of the first container 27.

In an application of the present invention wherein a fluid or fluids are to be introduced into the container 27, the container 27 is placed in an upright orientation as shown in FIG. 1. A nozzle (not shown) from a source of the fluid is attached to the input portion 13. The fluid is generally supplied to the input portion 13 at an elevated pressure—200–350 psi, for example—which is substantially greater than normal vapor pressures within the container cavity 37. Assuming the container 27 has not assumed a "filled" condition, the fluid from the source flows through the input channel 31, into the distribution cavity 45, and out through the branch channels 53 into the container cavity 37.

As the fluid flows from the (unshown) source to the container cavity 37, some of the fluid flows through the port 79 into the shut off cavity 63 and the seat cavity 85. If there were no outlet other than the port 79 for the fluid to escape from the shut off cavity 63 and the seat cavity 85, the pressure of the fluid within the shut off cavity 63 and the seat cavity 85 would quickly approach the pressure of the fluid in the distribution cavity 45 and the shut off means 7 would then prevent introduction of fluid into the container cavity 37.

There is, however, another outlet for the fluid to escape from the shut off cavity 63 and the seat cavity 85, namely alongside the stem portion 161 through the control bleed port 91 and the device bleed port 147, into the upper chamber 153 of the differential pressure control device 137 and through the grooves 179 in the upper and lower portions 139, 141, the passageways 177, and the valving arrangement 135. Fluid flowing through the valving arrangement 135 readily flows alongside the displacer 181, between the displacer 181 and the outer wall 103, and through the ports 182 and 183. The flow capacity of the control bleed port 91, the device bleed port 147, the grooves 179, the passageways 177, and the valving arrangement 135 is substantially greater than the flow capacity of the port 79 such that the pressure of the fluid within the shut off cavity 63 is generally substantially less than the pressure of the fluid within the distribution cavity 45.

For an application wherein the desired weight of fluid contained in the container 27 to provide a "filled" condition is twenty pounds, the displacer 181 has a weight/volume characteristic whereby the weight plus the spring force is equal to the buoyancy when the container 27 contains slightly under twenty pounds of the fluid as the container assumes an essentially upright orientation. In other words, the minimal additional weight of fluid required to place twenty pounds of fluid in the container 27 is just sufficient to overcome minimal frictional forces between the displacer 181 and the outer wall 103 and cause the displacer 181 be to buoyed the short distance upwardly such that the valving arrangement 135 prevents further flow of the fluid through the orifice arrangement 123 and causes the shut off means 7 to prevent further introduction of fluid into the container 27.

The level of fluid in the container cavity 37 at "filled" condition is dependent upon the density of the fluid being introduced into the container 27. In other words, the level of water—which has a specific gravity that is greater than the specific gravity of propane—needed to establish the fluid-tight sealing engagement of the valving arrangement 135 is lower than the level of propane needed to establish that sealing engagement. By minimizing the separation of the displacer 181 from both the bottom wall 195 and the top wall 196 of the container 27, and by minimizing the distance the displacer 181 must be displaced in order to establish the fluid-tight sealing engagement, the variance between the weights of different fluids needed to attain the "filled" condition is minimized, even though the specific gravities of the different fluids may be substantially different. In other words, at "filled" condition, the device 1 automatically prevents further introduction of fluid into the container 27 when the container 27 contains twenty pounds of the fluid, with only minimal error, regardless of whether the container 27 is filled with water or propane, etc.

Similarly, a fluid that has a temperature-dependent density will provide one level of fluid within the container 27 at one given temperature and will provide a different level of fluid within the container 27 at a different temperature. The weight of the fluid in the container 27, however, will be substantially the same regardless of the difference in temperatures as the difference in densities will provide "filled" buoyancy for the displacer 181 at the appropriate fluid level to provide the desired weight of fluid in the container cavity 37. Although the displacer 181 may have a thermal coefficient of expansion which could change the buoyancy characteristics of the displacer 181 at two different temperatures, such change would be negligible in comparison to the temperature-dependent change in density of the fluid being introduced into the container 27. Further, for those fluids that are compressible, the "filled" condition provided by the device is independent of pressure.

In the event that a user tries to deceive the device 1 by placing the container 27 in a non-upright orientation and thereby attempt to overfill the container 27, such as by tilting the container 27, or by lying the container 27 horizontally on its side for example, the spring 191 would displace the displacer 181 along the tail cavity 111 such that the valving arrangement 135 immediately establishes a fluid-tight sealing arrangement. As a result, the device 1 would prevent fluid from being introduced into the container cavity 37. Similarly, if the user attempts to overfill the container 27 by attempting to deceive the buoyancy characteristics of the displacer 181, such as by subjecting the container 27 to repeated upwardly directed thrusts or by arcuately swinging the container 27 downwardly in at attempt to utilize centrifugal force in combination with gravitational force, such maneuvering would simultaneously affect the compressibility/density of the fluid, thereby substantially rendering such tactics essentially ineffectual.

In other words, the device of the present invention is designed whereby acceleration force components on the fluid from such arcuate swinging of the container 27 are additive to gravitational force components on the fluid in the container 27 which, in turn, contribute to the buoyant forces acting axially along the displacer 181 and thereby offset the acceleration force components generated in the displacer 181 itself from such arcuate swinging of the container 27. As a result, introduction of additional fluid into the container 27 is prevented, as herein described, even though the container 27 is subjected to arcuate swinging, etc. For example, if an application of the present invention involves filling the container 27 with water, a downwardly arcuate displacement thereof does not change the density of the water which is substantially incompressible; such an arcuate displacement adds to the gravitational component affecting the fluid and therefore contributes to the buoyancy of the displacer 181. Further, if the container 27 is dropped, the inertial forces created at impact also similarly adds to the gravitational component and contributes to the buoyancy of the displacer 181.

As the fluid-tight sealing engagement of the valving arrangement 135 prevents fluid flow through the orifice arrangement 123, the flow of fluid through the grooves 179 and the passageways 177 is also prevented. Then, the only remaining outlet for fluid to escape from the shut off cavity 63 and the seat cavity 85 is into the upper chamber 153 of the differential pressure control device 137, which is obviously of limited capacity. As the quantity of fluid escaping from the seat cavity 85 into the upper chamber 153 through the control bleed port 91 and the device bleed port 147 is very limited, the fluid pressure in the seat cavity 85 rapidly approaches the fluid pressure in the distribution cavity 45.

As the pressure of fluid in the seat cavity 85 increases, additional fluid enters the upper chamber 153, forcing the disk portion 167 of the differential pressure control device 137 downwardly against the spring 169, thereby reducing the volume of the lower chamber 155. As the lower chamber 155 is connected in flow communication with the container cavity 37 via the port 197 through the lower portion 141 and the outer wall 103, fluid is forced from the lower chamber 155. As the pressure continues to increase in the seat chamber 85, the disk portion 167 is forced farther downwardly until the conically shaped upper end 163 forms a fluid-tight sealing engagement with the seat member 97, whereupon additional fluid is prevented from entering the upper chamber 153.

As all flow of the fluid through the control bleed port 91 and the device bleed port 147 is prevented, the fluid pressure in the seat cavity 85 and shut off cavity 63 rapidly approaches the fluid pressure in the distribution cavity 45, whereupon the hub 77 is forced against the lip 51, preventing fluid flow through the input channel 31 and the branch channels 53.

Generally, the spring 169 is configured to resist a downward pressure against the disk portion 167 of a predetermined magnitude in the range of approximately one-tenth to ten pounds per square inch, preferably approximately one pound per square inch. Thus, the flow of the fluid being introduced into the container 27 at a pressure of 200–350 psi is effectively controlled by a predetermined magnitude of differential pressure across the differential pressure control device 137 in the range of approximately only one-tenth to ten pounds per square inch.

It is foreseen that the container 27 may be configured with two of the devices 1 for some applications wherein two fluids or two mixtures of fluids are to be combined by weight, as schematically shown in FIG. 9. In that event, a first fluid or mixture of fluids would be introduced into the container 27 through a first one of the devices 1, designated by the numeral 201 in FIG. 9. The device 201 would be configured to permit the container 27 to receive or contain up to a predetermined weight of the first fluids, represented by the dotted line designated by the numeral 203. Then, a second fluid or mixture of fluids would be introduced through the other one of the devices 1, designated by the numeral 205 in FIG. 9. The device 205 would be configured to permit the container 27 to contain up to a predetermined total weight for both of the first and second fluids, represented by the dotted line designated by the numeral 207. The same concept can be extended to mixtures by weight of more than two fluids or more than two mixtures or fluids by using a corresponding number of the devices 1. For example, the present invention may be used to "cut" 100 proof whiskey to 86 proof whiskey.

A first modified embodiment in accordance with the present invention is shown in FIG. 10 and is generally designated by the numeral 301. Many of the characteristics of the first modified embodiment 301 are substantially similar to those of the previously described embodiment 1 and will not be reiterated here in detail. The device 301 comprises body means 303, fluid-weight control means 305, and shut off means 307.

The body means 303 generally includes an input portion 313, an intermediate portion 315, and a tail portion 317. The input portion 313 generally has an axially extending input channel 319 for receiving fluid therethrough with a throat 321 leading into a distribution cavity 323. An upper wall 329 of the distribution cavity 323 is configured such that a circularly shaped lip 331 extends downwardly therefrom. At least one branch channel 333, and perhaps a plurality thereof depending on the application, is configured to distribute fluid from the distribution cavity 323 to the container (not shown in FIG. 10), as indicated by the arrows designated by the numeral 335.

The shut off means 307 includes a generally cylindrically shaped shut off cavity 337 generally aligned with the distribution cavity 323. The shut off means 307 also includes a partition arrangement 339 configured to substantially separate the distribution cavity 323 from the shut off cavity 337. The partition arrangement 339 includes a layer 345 secured to a partition wall 347, such as by a rivet 349 or other suitable device, as shown in FIG. 10. The layer 345 and the partition wall 347 each have a generally circular plan profile.

The rivet 349 has a port 351 axially therethrough. The diametric dimension of the port 351 is substantially smaller than the transverse dimensions of each of the throat 321 and the cross-sectional areas available for fluid flow through the branch channels 333. As a result, the volume of fluid flowing through the port 351 is minimal in comparison to the volume of fluid flowing through the branch channels 333.

The layer 345 is generally constructed of resilient, flexible material, such as fabricized rubber or other suitable material, for example, such that as the partition wall 347 is displaced axially by a compression-type spring 353 and fluid pressure in the shut off cavity 337 to cause the layer 345 to abuttingly engage the lip 331 as described herein, fluid is prevented from being distributed from the input channel 319 to the distribution cavity 323 and the branch channels 333. The partition wall 347 is configured such that as the pressure of fluid within the shut off cavity 337 is substantially less than the pressure of fluid within the distribution cavity 323, the layer 345 will be spaced apart from the lip 331, sometimes referred to herein as an open configuration 355, as shown in FIG. 10. The partition wall 347 and the spring 353 are further configured whereby the layer 345 is not spaced apart from the lip 331 as the fluid pressure within the shut off cavity 337 approaches the fluid pressure within the distribution cavity 323 but, instead, is displaced upwardly to establish the aforesaid abutting engagement with the lip 331, sometimes referred to herein as a closed configuration.

The adjacent transverse dimensions of the shut off cavity 337 and the distribution cavity 323 are substantially similar but are substantially greater than the transverse dimension of the throat 321. Therefore, as the layer 345 bears against the lip 331, the upwardly directed force of the fluid in the shut off cavity 337 maintaining the abutting engagement therebetween is substantially greater than the downwardly directed force of the fluid in the throat 321, unless the fluid is vented from the shut off cavity 337, such as through a bleed port 357.

In other words, the compression spring 353 assists with forcing the layer 345 against the lip 331 as the device 301 assumes the closed configuration. The spring constant of the spring 353, however, must be such that the spacing relation between the layer 345 and the lip 331 can operably assume the open configuration 355 as the fluid pressure in the shut off cavity 337 is substantially less than the fluid pressure in the distribution cavity 323. The effective cross-sectional area of the partition arrangement 339 exposed to the shut off cavity 337 is substantially greater than the cross-sectional area of the throat 321 opposing the shut off cavity 337. Thus, as the layer 345 bears against the lip 331, the upwardly directed force of the fluid in the shut off cavity 337 maintaining the abutting engagement therebetween is substantially greater than the downwardly directed force of the fluid in the throat 321, unless the fluid is vented through the control bleed port 357, which occurs while the shut off means 307 permits introduction of fluid into the container 327.

The shut off means 307 also includes a control device 361 having a pilot cavity 363 and a pilot valve 365 that is configured, in conjunction with the bleed port 357, to operably prevent fluid flow from the shut off cavity 337 to the pilot cavity 363. The pilot valve 365 includes an adapter 367 and plunger 369, the latter configured to provide a fluid-tight seal 370 with an enlarged portion 371 of the bleed port 357 and to cooperatively establish a fluid-tight seal with the bleed port 357. A sealing mechanism 373, such as an O-ring or other suitable arrangement, similarly provides a fluid-tight seal between the adapter 367 and walls of the pilot cavity 363. A compression-type spring 375 is configured to provide a normally open configuration for the pilot valve 365. Generally, the spring 375 is configured to resist a predetermined upward pressure against the adapter 367 in the range of approximately one-tenth to ten pounds per square inch.

A bypass 377 provides flow communication from the bleed port 357, upstream from the seal 370, to a lower portion of the pilot cavity 363. If desired, a relief valve 379 may be provided to limit the magnitude by which fluid pressure in the pilot cavity 363 may operably exceed the fluid pressure in the container cavity, such as in the range of approximately one to ten pounds/square inch, but greater than the magnitude of pressure required to cause the adapter 367 and the plunger 369 to be displaced such that the fluid-tight sealing engagement is established by the plunger 369 and the bleed port 357. A channel 380 provides fluid flow communication from a portion 378 of the pilot cavity 363 that is sealed between the sealing mechanisms 370, 373 such that the fluid pressure within the portion 378 is substantially the same as the fluid pressure within the container cavity.

The tail portion 317 has a cylindrically shaped outer wall 381 extending from the intermediate portion 315 and having a tail cavity 383. An orifice arrangement 385 provides fluid flow communication between the pilot cavity 363 and the tail cavity 383. As before, the fluid-weight control means 305 includes a float or displacer 387, which, in conjunction with the orifice arrangement 385, provides a fluid-tight valving arrangement 393 for operably preventing fluid flow from the pilot cavity 363 to the tail cavity 383. One or more ports 389 provide fluid flow communication between the tail cavity 411 and the container cavity.

In an application of the first modified embodiment of the present invention and assuming the container has not assumed a "filled" condition, the fluid from a source flows through the input channel 319 and throat 321, into the distribution cavity 323, and out through the branch channels 333 into the container cavity.

As the fluid so flows into the container cavity, some of the fluid flows through the port 351 into the shut off cavity 337. If there were no outlet for the fluid to escape from the shut off cavity 337, the fluid pressure within the shut off cavity 337 would quickly equalize with the fluid pressure in the distribution cavity 323 and the shut off means 307 would then prevent introduction of fluid into the container cavity.

Since, however, the pilot valve 365 assumes a normally open configuration, fluid can escape from the shut off cavity 337, namely through the bleed port 357, through the bypass 377 into the pilot cavity 363, into the tail cavity 383 through the orifice arrangement 385, and into the container cavity through the ports 389. The composite flow capacity of the bleed port 357, the bypass 377, the orifice arrangement 385, and the ports 389 is substantially greater than the flow capacity of the port 351 through the rivet 349 such that the fluid pressure within the shut off cavity 337 is generally substantially less than the fluid pressure within the distribution cavity 323.

As the fluid-tight sealing engagement of the valving arrangement 393 is established by the displacer 387 as hereinbefore described, fluid flow through the orifice arrangement 385 is prevented. As a result, fluid pressure in the shut off cavity 337 increases and, due to the fluid flow through the bypass 377, fluid pressure in the lower portion of the pilot cavity 363 also increases.

As the fluid pressure in the lower portion of the pilot cavity 363 increases, the adapter 367 is forced upwardly against the spring 375. As the pressure continues to increase in the pilot cavity 363, the adapter 367 is forced farther upwardly until the plunger 369 establishes a fluid-tight sealing engagement with the bleed port 357, whereupon additional fluid is prevented from escaping from the shut off cavity 337. As a result, fluid pressure in the shut off cavity 337 rapidly approaches the fluid pressure in the distribution cavity 323, whereupon the layer 345 is forced against the lip 331, preventing fluid flow through the input channel 319 and the branch channels 333.

Figure 12:
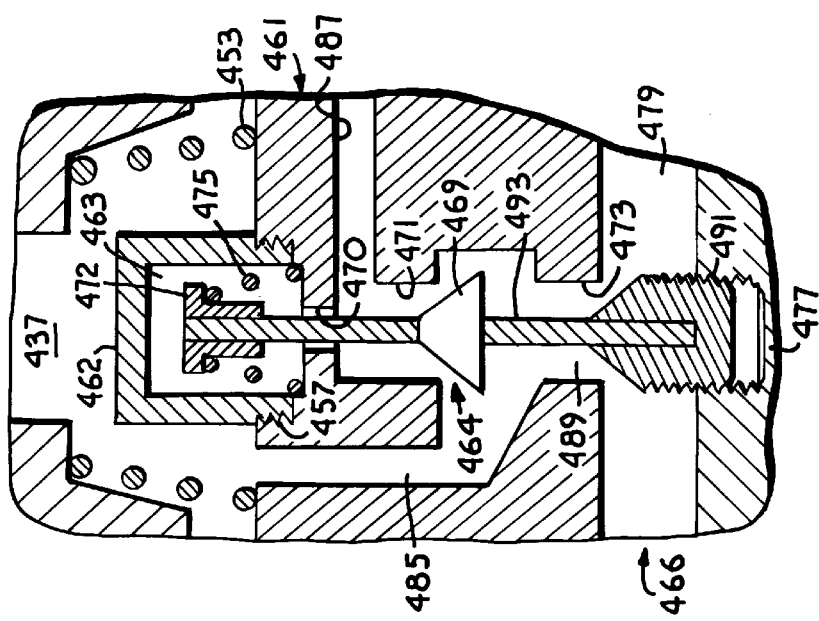
FIG. 12 is a further enlarged longitudinal and fragmentary, cross-sectional view of the second modified embodiment of the fluid-weight control device, similar to FIG. 11 but showing an alternative arrangement for adjusting the buoyancy of a displacer.

A second modified embodiment in accordance with the present invention is shown in FIGS. 11 and 12 and is generally designated by the numeral 401. Many of the characteristics of the second modified embodiment 401 are substantially similar to those of the previously described embodiments 1 and 301 and will not be reiterated here in detail. The device 401 comprises body means 403, fluid-weight control means 405, and shut off means 407.

The body means 403 generally includes an input portion 413, an intermediate portion 415, and a tail portion 417. The input portion 413 generally has an axially extending input channel 419 for receiving fluid therethrough with a throat 421 leading into a distribution cavity 423. An upper wall 429 of the distribution cavity 423 has a generally conically shaped configuration, as suggested in FIG. 11. A sealing mechanism 431, such as an O-ring or other suitable arrangement, may be mounted to the upper wall 429 to operably establish a fluid-tight sealing engagement between the upper wall 429 and the tapered edge 450. It is to be understood that the O-ring 431 may be mounted either to the upper wall 429 (as shown) or to the tapered edge 450. At least one branch channel 433, and perhaps a plurality thereof depending on the application, is configured to distribute fluid from the distribution cavity 423 to the container (not shown in FIG. 11), as indicated by the arrows designated by the numeral 435.

The shut off means 407 includes a shut off cavity 437 and a partition or thimble arrangement 439 configured to substantially separate the distribution cavity 423 from the shut off cavity 437. The shut off cavity 437 has a "bell" shaped cross-sectional configuration with a sloping wall portion 441, as shown in FIG. 11. The partition arrangement 439 has a partition wall 447 with a port 451 axially therethrough, a tapered edge 450, and a flared portion 452. The diametric dimension of the port 451 is substantially smaller than the transverse dimensions of each of the throat 421 and the cross-sectional areas available for fluid flow through the branch channels 433. As a result, the volume of fluid flowing through the port 451 is minimal in comparison to the volume of fluid flowing through the branch channels 433.

The partition arrangement 439 is mounted such that it is slidably displaceable axially by a compression-type spring 453 and by fluid pressure in the shut off cavity 437 to cause the fluid-tight sealing engagement to be established by the O-ring 429 and to thereby prevent fluid from being distributed from the input channel 419 to the distribution cavity 423 and the branch channels 433. An O-ring 454 prevents fluid flow around the partition arrangement 439 from the distribution cavity 423 to the shut off cavity 437.

The partition wall 447 is configured such that as the pressure of fluid within the shut off cavity 437 is substantially less than the pressure of fluid within the distribution cavity 423, the tapered edge 450 will be spaced apart from the upper wall 429 such that the fluid-tight sealing engagement is not established therebetween by the O-ring 429, sometimes referred to herein as an open configuration 455, as shown in FIG. 11. The partition wall 447 and the spring 453 are further configured whereby the tapered edge 450 is spaced in close proximity to the upper wall 425 such that a fluid-tight sealing engagement is established therebetween as the fluid pressure within the shut off cavity 437 approaches the fluid pressure within the distribution cavity 423, sometimes referred to herein as a closed configuration.

The transverse dimensions of the shut off cavity 437 and the distribution cavity 423 are substantially greater than the transverse dimension of the throat 421. Therefore, as the tapered edge 450 bears against the O-ring 431, the upwardly directed force of the fluid in the shut off cavity 437 maintaining the abutting engagement therebetween is substantially greater than the downwardly directed force of the fluid in the throat 421 unless the fluid is vented from the shut off cavity 437, such as through a bleed port 457.

In other words, the compression spring 453 assists with establishing the fluid-tight sealing engagement between the upper wall 429 and the tapered edge 450 as the device 401 assumes the closed configuration. The spring constant of the spring 453, however, must be such that the spacing relationship between the tapered edge 450 and the upper wall 429 can operably assume the open configuration 455 as the fluid pressure in the shut off cavity 437 is substantially less than the fluid pressure in the distribution cavity 423. The effective cross-sectional area of the partition arrangement 439 exposed to the shut off cavity 437 is substantially greater than the cross-sectional area of the throat 421 opposing the shut off cavity 437. Thus, as the tapered edge 450 bears against the O-ring 431, the upwardly directed force of the fluid in the shut off cavity 437 maintaining the abutting engagement therebetween is substantially greater than the downwardly directed force of the fluid in the throat 421, unless the fluid is vented through the port 451 which occurs while the shut off means 407 permits introduction of fluid into the container.

The shut off means 407 also includes a control device 461 having valves 464, 466 that are configured to operably prevent fluid flow from the shut off cavity 437 as the device 401 assumes a closed configuration wherein fluid is prevented from being introduced into the container cavity. The valve 465 includes a valve 469 to provide a fluid tight sealing engagement with an orifice 471; and the valve 466 includes a valving arrangement to simultaneously provide a fluid-tight sealing engagement with an orifice 473. The orifices 471, 473 have substantially identical cross-sectional areas and are connected by channels to the shut off cavity 437, the container cavity, and a tail cavity 479, such as by channels 485, 487, 489, as shown in FIG. 11. The valve 469 and an adapter 491 of a displacer 477 are adjustably connected to a threaded rod 493.

An alternative arrangement of the second modified embodiment 401 is shown in FIG. 12 wherein the control device 461 of the shut off means 407 also includes a cap 462 having a pilot cavity 463 therein. An orifice 470 permits the threaded rod 493 to be extended therethrough to threadedly receive a adapter 472 thereon. A compression-type spring 475, in conjunction with the adapter 472, is configured to partially offset the weight of the displacer 477, as hereinbefore described, such that the displacer 477 becomes buoyant as the container contains the desired weight of fluid. As before, if the container is tilted from its normal operating orientation, the spring 475 will not be resisted by gravitational forces of the displacer 477 to the extent that it would be if the container has such normal orientation and, therefore, will responsively prevent introduction of additional fluid into the container. In other words, the spring situated at the bottom of the displacer 477 as hereinbefore described may be replaced by the spring 475.

In an application of the second modified embodiment of the present invention and assuming the container has not assumed a "filled" condition, the fluid from a source flows through the input channel 419 and throat 421, into the distribution cavity 423, and out through the branch channels 433 into the container cavity.

As the fluid so flows into the container cavity, some of the fluid flows through the port 451 into the shut off cavity 437. If there were no outlet for the fluid to escape from the shut off cavity 437, the fluid pressure within the shut off cavity 437 would quickly equalize with the fluid pressure in the distribution cavity 423 and the shut off means 407 would then prevent introduction of fluid into the container cavity.

Until the displacer 477 becomes buoyant, fluid can escape from the shut off cavity 437, namely through the channels 485, 487, 489 into the tail cavity 479 and the container cavity. The composite flow capacity of the channels 485, 487, 489 is substantially greater than the flow capacity of the port 451 such that the fluid pressure within the shut off cavity 437 is generally substantially less than the fluid pressure within the distribution cavity 423.

As the fluid-tight sealing engagement of the valving arrangement 466 is established by the displacer 477, fluid flow through the orifice arrangement 473 is prevented. In addition, fluid flow through the valves 464, 466 is also prevented. As the pressure continues to increase in the shut off cavity 437 such that the fluid pressure in the shut off cavity 437 approaches the fluid pressure in the distribution cavity 423, the partition arrangement 439 is forced upwardly establishing a fluid-tight sealing engagement between the upper wall 429 and the tapered edge 450, preventing fluid flow through the input channel 419 and the branch channels 433.

It should be noted that since the orifices 471, 473 have substantially identical cross-sectional areas, the upward force directed by the fluid along the rod 493 against the valve 466 is substantially equal to the downward force directed by the fluid along the rod 493 against the valve 468. Therefore, any tendency by the fluid pressure to influence the buoyancy characteristic provided by the displacer 477 is essentially canceled.

A third modified embodiment in accordance with the present invention is shown in FIGS. 13 through 16 and is generally designated by the numeral 501. Many of the characteristics of the third modified embodiment 501 are substantially similar to those of the embodiments previously described herein and will not be reiterated here in detail. One variation of the device 501, shown in FIGS. 13 and 14, comprises body means 503, fluid-weight control means 505, and shut off means 507, as partially shown in FIGS. 13 and 14. The body means 503 generally includes an intermediate portion 515 and a tail portion 517 having a tail cavity 519. The shut off means 507 includes a shut off cavity 537 substantially separated from a distribution cavity (not shown in FIGS. 13 through 16) as hereinbefore described. A channel 541 extends axially from the shut off cavity 537 to the tail cavity 519.

The shut off means 507 also includes a control device 551 having an inverted cap 561 with a top wall 562 and substantially vertical side walls 564 enclosing a cavity 563 therein. The horizontal cross-section of the cap 561 may be square, circular, or other suitable configuration. The cap 561 is attached such that a fluid-tight seal is established about the channel 541 at a lower extremity of the side walls 564 of the cap 561. Also, the channel 541 provides fluid flow communication between the cavity 563 and the tail cavity 519. A rod 563, connected to a displacer 567, extends upwardly from the displacer 567 through the channel 541 and into the cavity 563.

The shut off means 507 includes at least one valve 574, such as a ball 577 configured to sealingly mate with an orifice 579 to operably form a fluid-tight sealing engagement therebetween. For example, a configuration wherein the side walls 564 of the cap 561 has a square or rectangular horizontal cross-sectional configuration and the orifice 579 is positioned in a planar side thereof, the orifice 579 may having a countersink-type profile; or a configuration wherein the cap 561 has a circular horizontal cross-sectional configuration as where the sides of the cap 561 are a portion of a tube, the orifice 579 would be corresponding conformed to provide the desired fluid-tight sealing arrangement.

The rod 563 has an enlarged portion 581, that is positioned alongside the balls 577 as the displacer 567 indicates a non-"filled" condition, thereby preventing the balls 577 from forming the fluid-tight sealing engagement with the respective orifices 579, and that is elevated above the balls 577 as the displacer 567 becomes buoyant indicating a "filled" condition, thereby allowing the balls 577 to form the fluid-tight sealing engagement with the respective orifices 579.

Figure 14:
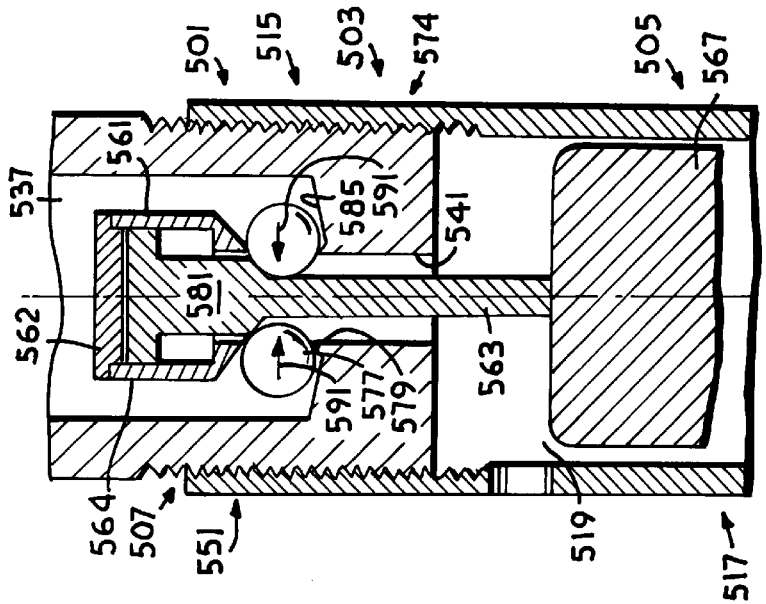
FIG. 14 is a fragmentary, cross-sectional view of the third modified embodiment of the fluid-weight control device, similar to but enlarged from that shown in FIG. 13 and showing the device in a closed configuration.
Figure 13:
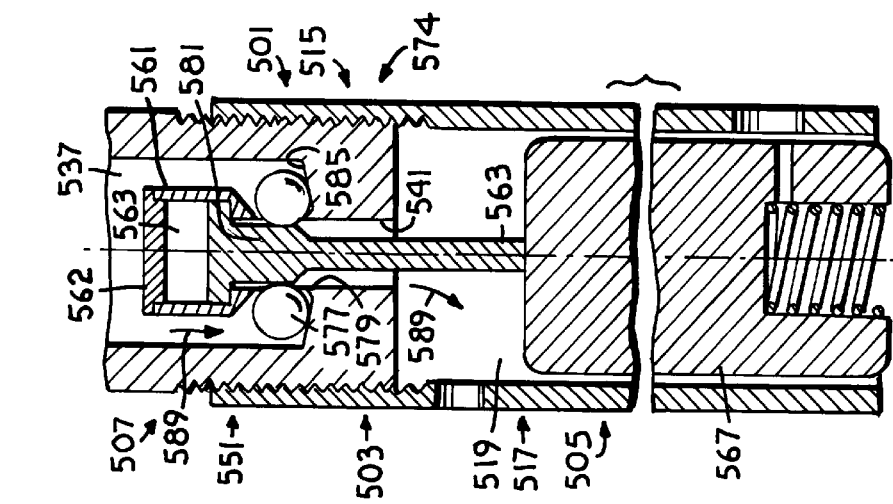
FIG. 13 is a fragmentary, cross-sectional view of a third modified embodiment of the fluid-weight control device, similar in scale to that shown in FIG. 8, showing the device in an open configuration, according to the present invention.

One of the devices 501 having two of the valves 574 is shown in FIGS. 13 through 16. In the configuration shown in FIGS. 13 and 14, a bottom surface 585 of the shut off cavity 537 is shown sloping toward the cap 561 in order for the balls 577 to realize a slight gravitational urge toward formation of the sealing engagement with the respective orifices 579. An open configuration thereof is shown in FIG. 13, and a closed configuration thereof is shown in FIG. 14.

A different configuration of the device 501 is symbolically shown in FIGS. 15 and 16 wherein a weak compression-type spring 587 is utilized to assist with formation of the sealing engagement between the balls 577 and the orifices 579. A closed configuration thereof is shown in FIG. 15, and an open configuration thereof is shown in FIG. 16.

In an application of the third modified embodiment of the present invention and assuming the container has not assumed a "filled" condition, fluid is applied to the device 501 from a source as aforesaid. Since the container has not assumed a "filled" condition, the displacer 567 is not buoyant, and the enlarged portion 581 is spaced alongside the balls 577 such that the valves 574 assume the open configuration, with fluid flow as indicated by the arrows designated by the numeral 589 in FIGS. 13 and 16. As a result, fluid flowing into the shut off cavity 537 as aforesaid also flows into the tail cavity 519, thereby maintaining the fluid pressure within the shut off cavity 537 at a pressure that is substantially less than the pressure at which fluid is being introduced into the container.

As the displacer 567 becomes buoyant, the enlarged portion 581 is elevated to a position wherein the enlarged portion 581 no longer interferes with the balls 577. As a result, the balls 577 are displaced inwardly, as indicated by the arrows designated by the numeral 591 in FIGS. 14 and 15, such that each of the valves 574 assume the closed configuration, thereby establishing the desired fluid-tight seal. There then being no outlet for fluid to escape from the shut off cavity 537, the fluid pressure within the shut off cavity 537 quickly approaches the pressure of the fluid being introduced into the container cavity, causing the shut off means 507 to prevent further introduction of fluid into the container cavity as aforesaid.

It is to be understood that while certain forms of the present invention have been illustrated and described herein, it is not to be limited to the specific forms or arrangement of parts described and shown.

What is claimed and desired to be secured by Letters Patent is as follows:

1. A device for introducing fluid into a container, comprising:

(a) a body configured to mount to the container;
   (b) a detector mechanism connected to said body, said detector mechanism having a displacer and being configured such that buoyancy forces of said displacer slightly exceed gravitational forces thereof as fluid contained in the container reaches a desired weight and is further configured to be substantially independent of the specific gravity and composition of the fluid contained in the container; and
   (c) a shut off mechanism solely responsive to said detector mechanism configured to automatically prevent introduction of additional fluid into the container as said detector mechanism determines that said fluid contained in the container has reached said desired weight.

2. The device according to claim 1, wherein said displacer extends substantially the entire depth of the container as the container assumes a normal operating orientation.

3. The device according to claim 1, wherein said detector mechanism includes:

a resilient member configured to partially offset the weight of said displacer as the container assumes a normal operating orientation.

4. The device according to claim 1, wherein said shut off mechanism is further configured to prevent introduction of fluid into the container when the container is not oriented in a normal operating orientation even though the fluid contained in the container may comprise less than said desired weight.

5. The device according to claim 1, wherein said detector mechanism is configured to be substantially independent of the temperature of the fluid contained in the container.

6. The device according to claim 1, wherein said detector mechanism is configured to be substantially independent of inertial effects induced in said device and fluid in an attempt to introduce additional fluid into the container.

7. The device according to claim 1, wherein:

a) said body includes a tail portion; and
   b) said displacer is configured to slide axially within said tail portion.

8. The device according to claim 1, wherein said shut off mechanism includes a differential pressure control device configured to activate said shut off mechanism even though fluid pressure at said detector mechanism is substantially less than the pressure at which fluid is being introduced into the container.

9. The device according to claim 8, wherein said differential pressure across said differential pressure control device is configured to be activated by a predetermined magnitude of differential pressure thereacross.

10. The device according to claim 9, wherein said predetermined magnitude of said differential pressure is in a range between approximately one-tenth and ten pounds per square inch.

11. The device according to claim 9, wherein said predetermined magnitude of differential pressure across said differential pressure control device is approximately one pound per square inch.

12. The device according to claim 1, wherein said shut off mechanism includes a pilot valve arrangement configured to cause said shut off mechanism to operably assume a closed configuration, wherein said pilot valve arrangement is activated by a fluid pressure that is substantially less than the pressure at which fluid is being introduced into the container.

13. The device according to claim 1, wherein said shut off mechanism includes a differential pressure control device configured to reduce fluid pressure at said detector mechanism substantially below the pressure at which fluid is being introduced into the container.

14. An apparatus, comprising:

(a) a container having a cavity; and
   (b) a fluid-weight control mechanism configured to introduce a weight of fluid into said cavity wherein said weight may be up to, but is automatically prevented from exceeding, a predetermined weight of the fluid, wherein said fluid weight control mechanism is substantially independent of the composition of fluid contained in said cavity, and wherein said fluid-weight control mechanism includes a detection mechanism with a displacer that is configured such that buoyancy forces of said displacer slightly exceed gravitational forces thereof as the fluid in the container reaches said predetermined weight of fluid.

15. The apparatus according to claim 14, wherein said detection mechanism is configured to detect whether said cavity substantially contains said predetermined weight of the fluid.

16. The apparatus according to claim 15, wherein said displacer extends substantially the entire depth of the fluid in said cavity as said container assumes an upright orientation.

17. The apparatus according to claim 15, wherein said detection mechanism includes:

a resilient member configured to operably partially offset the weight of said displacer as said container assumes a normal operating orientation.

18. The apparatus according to claim 17, wherein said resilient member is adapted to a particular composition of fluid to be introduced into said container.

19. The apparatus according to claim 15, wherein said fluid-weight control mechanism includes:

(a) an orifice arrangement; and (b) said displacer being configured, in conjunction with said orifice arrangement, to operably activate said fluid-weight control mechanism as the fluid contained in said container comprises said predetermined weight.

20. The apparatus according to claim 15, wherein said fluid-weight control mechanism is further configured to prevent introduction of fluid into said cavity as said container assumes a non-upright orientation even though the fluid contained in said cavity may comprise less than said predetermined weight of the fluid.

21. The apparatus according to claim 15, wherein said fluid-weight control mechanism is configured such that said apparatus is substantially independent of the temperature of the fluid contained in said cavity.

22. The apparatus according to claim 15, wherein said fluid-weight control mechanism is configured to be substantially independent of inertial effects induced in said apparatus and fluid in an attempt to introduce additional fluid into said container as said cavity substantially contains said predetermined weight of the fluid.

23. The apparatus according to claim 15, wherein said fluid-weight control mechanism includes:

(a) a tail portion;

(b) an orifice arrangement; and (c) said displacer being configured to slide axially within said tail portion, said displacer configured, in conjunction with said orifice arrangement, to operably activate said fluid-weight control mechanism as the weight of fluid contained in said container approaches or exceeds said predetermined weight.

24. The apparatus according to claim 15, wherein said fluid-weight control mechanism includes a differential pressure control device configured to activate said fluid-weight control mechanism even though pressure at said detection mechanism may be substantially less than the pressure at which fluid is being introduced into said container.

25. The apparatus according to claim 24, wherein said differential pressure across said differential pressure control device is configured to be activated by a predetermined magnitude of differential pressure thereacross.

26. The apparatus according to claim 25, wherein said predetermined magnitude of said differential pressure is in a range between approximately one-tenth and ten pounds per square inch.

27. The apparatus according to claim 24, wherein said differential pressure across said differential pressure control device is approximately one pound per square inch.

28. The apparatus according to claim 15, wherein said fluid-weight control mechanism includes a pilot valve arrangement configured to cause said shut off mechanism to operably assume a closed configuration, wherein said pilot valve arrangement is activated by a fluid pressure that is substantially less than the pressure at which fluid is being introduced into the container.

29. The apparatus according to claim 15, wherein said fluid-weight control mechanism includes a differential pressure control device configured to reduce fluid pressure at said detection mechanism substantially below the pressure at which fluid is being introduced into the container.

30. A method of preventing overfilling of a container with fluid, said method comprising the steps of:

(a) introducing the fluid into the container through a device installed through a wall of the container, wherein said device includes a displacer that is configured such that buoyancy forces of said displacer slightly exceed gravitational forces thereof as the fluid contained in the container reaches a predetermined weight of the fluid;

(b) using said device to stop filling of the container when the container substantially contains said predetermined weight of the fluid substantially irrespective of the specific gravity of the fluid; and (c) further using said device to automatically prevent introduction of additional fluid into the container upon determining that the container substantially contains said predetermined weight of the fluid.

\* \* \* \* \*